(12) United States Patent
Fuchs

(10) Patent No.: US 10,467,292 B2
(45) Date of Patent: *Nov. 5, 2019

(54) SUGGESTING QUERY ITEMS BASED ON DATABASE FIELDS

(71) Applicant: salesforce.com, inc., San Francisco, CA (US)

(72) Inventor: Matthew Fuchs, Los Gatos, CA (US)

(73) Assignee: salesforce.com, inc., San Francisco, CA (US)

( * ) Notice: Subject to any disclaimer, the term of this patent is extended or adjusted under 35 U.S.C. 154(b) by 346 days.

This patent is subject to a terminal disclaimer.

(21) Appl. No.: 15/444,915

(22) Filed: Feb. 28, 2017

(65) Prior Publication Data

US 2018/0246901 A1 Aug. 30, 2018

(51) Int. Cl.
*G06F 16/00* (2019.01)
*G06F 16/9032* (2019.01)
*G06F 16/242* (2019.01)

(52) U.S. Cl.
CPC ...... *G06F 16/90324* (2019.01); *G06F 16/242* (2019.01)

(58) Field of Classification Search
CPC .. G06F 16/90324; G06F 16/242; G06F 16/23; G06F 16/182; G06F 16/162; G06F 16/254; G06F 16/24; G06F 3/06; G06F 16/2455; G06F 16/3344; G06F 16/328; G06F 16/248; G06F 16/9535; G06F 16/00; G06F 11/1464; G06F 11/1446; G06F 17/273; G06F 17/277; G06F 17/30; H04L 67/1097; H04L 45/74; H04L 69/22; G06K 15/00; G06Q 50/01
See application file for complete search history.

(56) References Cited

U.S. PATENT DOCUMENTS

| | | | |
|---|---|---|---|
| 5,577,188 A | 11/1996 | Zhu | |
| 5,608,872 A | 3/1997 | Schwartz | |
| 5,649,104 A | 7/1997 | Carleton | |
| 5,715,450 A | 2/1998 | Ambrose et al. | |
| 5,761,419 A | 6/1998 | Schwartz | |
| 5,819,038 A | 10/1998 | Carleton | |
| 5,821,937 A | 10/1998 | Tonelli et al. | |

(Continued)

OTHER PUBLICATIONS

U.S. Appl. No. 13/986,251, Apr. 16, 2013.

*Primary Examiner* — Anh Ly
(74) *Attorney, Agent, or Firm* — Dergosits & Noah LLP; Todd A. Noah

(57) ABSTRACT

Suggesting query items based on database fields is described. A database system receives a character sequence entered in a search box. The database system identifies a first distribution of first field-based items that include the character sequence, and a second distribution of second field-based items that include the character sequence. The database system identifies a first item based on combining the first distribution with a distribution of queried fields, and a second item based on combining the second distribution with the distribution of queried fields. The database system outputs the first item and the second item to a location associated with the search box. The database system executes a search based on any requested item, in response to receiving a request to search for any item output to the location associated with the search box.

20 Claims, 5 Drawing Sheets

(56) References Cited

U.S. PATENT DOCUMENTS

| | | |
|---|---|---|
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier |
| 6,654,032 B1 | 11/2003 | Zhu |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,062,502 B1 | 6/2006 | Kesler |
| 7,340,411 B2 | 3/2008 | Cook |
| 7,356,482 B2 | 4/2008 | Frankland et al. |
| 7,401,094 B1 | 7/2008 | Kesler |
| 7,620,655 B2 | 11/2009 | Larsson |
| 7,698,160 B2 | 4/2010 | Beaven et al. |
| 7,779,475 B2 | 8/2010 | Jakobson et al. |
| 7,851,004 B2 | 12/2010 | Hirao et al. |
| 8,010,663 B2 | 8/2011 | Firminger et al. |
| 8,014,943 B2 | 9/2011 | Jakobson |
| 8,015,495 B2 | 9/2011 | Achacoso et al. |
| 8,032,297 B2 | 10/2011 | Jakobson |
| 8,082,301 B2 | 12/2011 | Ahlgren et al. |
| 8,095,413 B1 | 1/2012 | Beaven et al. |
| 8,095,594 B2 | 1/2012 | Beaven et al. |
| 8,209,308 B2 | 6/2012 | Jakobson et al. |
| 8,275,836 B2 | 9/2012 | Beaven et al. |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 2001/0044791 A1 | 11/2001 | Richter et al. |
| 2002/0072951 A1 | 6/2002 | Lee et al. |
| 2002/0082892 A1 | 6/2002 | Raffel |
| 2002/0129352 A1 | 9/2002 | Brodersen et al. |
| 2002/0140731 A1 | 10/2002 | Subramanian et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2004/0001092 A1 | 1/2004 | Rothwein et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2005/0228779 A1* | 10/2005 | Chaudhuri ........ G06F 16/24545 707/999.003 |
| 2007/0162422 A1* | 7/2007 | Djabarov ............ G06F 16/2453 707/E17.063 |
| 2009/0063415 A1 | 3/2009 | Chatfield et al. |
| 2009/0100342 A1 | 4/2009 | Jakobson |
| 2009/0177744 A1 | 7/2009 | Marlow et al. |
| 2009/0299976 A1* | 12/2009 | Dexter .................... G06F 17/24 707/E17.127 |
| 2010/0131316 A1* | 5/2010 | Ben-Hamida .......... G06Q 10/08 705/400 |
| 2010/0169341 A1* | 7/2010 | Hu .................... G06F 16/90324 707/758 |
| 2010/0223258 A1* | 9/2010 | Ghahramani ........ G06K 9/6278 707/723 |
| 2012/0101965 A1* | 4/2012 | Hennig ................... G06N 20/00 706/12 |
| 2012/0233137 A1 | 9/2012 | Jakobson et al. |
| 2012/0265787 A1* | 10/2012 | Hsu .................... G06F 16/3322 707/780 |
| 2013/0080460 A1* | 3/2013 | Tomko ................ G06F 16/9535 707/767 |
| 2013/0218948 A1 | 8/2013 | Jakobson |
| 2013/0218949 A1 | 8/2013 | Jakobson |
| 2013/0218966 A1 | 8/2013 | Jakobson |
| 2013/0347116 A1* | 12/2013 | Flores ................. H04L 63/1433 726/25 |
| 2014/0164776 A1* | 6/2014 | Hook ....................... H04L 9/14 713/171 |
| 2014/0195519 A1* | 7/2014 | Holt .................... G06F 16/3322 707/722 |
| 2014/0359537 A1 | 12/2014 | Jakobson et al. |
| 2015/0007050 A1 | 1/2015 | Jakobson et al. |

(56) References Cited

U.S. PATENT DOCUMENTS

| | | |
|---|---|---|
| 2015/0095162 A1 | 4/2015 | Jakobson et al. |
| 2015/0172563 A1 | 6/2015 | Jakobson et al. |
| 2016/0350386 A1* | 12/2016 | Zhu .................... G06F 16/248 |
| 2017/0178012 A1* | 6/2017 | Borza ................ G06F 16/9574 |
| 2017/0192991 A1* | 7/2017 | Touma ............... G06F 16/3322 |
| 2017/0351241 A1* | 12/2017 | Bowers ............... G05B 19/406 |

\* cited by examiner

SUGGESTING QUERY ITEMS BASED ON DATABASE FIELDS

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

Given a large collection (millions or billions) of small sets of items (which may be called market baskets) sampled from an existing universe of items (such as products, services, or search terms), automated recommendation of items is often based on the identification of frequently occurring item sets, which are sets of items that were purchased or otherwise chosen together. There are other recommendation algorithms, such collaborative filtering, for circumstances when system users sample one item at a time. Frequent item sets is for circumstances when system users choose items together. Market basket analysis is a process in which retailers evaluate information in such market baskets to understand the purchase behavior of customers. This information can then be analyzed for purposes of cross-selling, the practice of selling an additional product or service to an existing customer. Examples of market basket analysis for cross selling are automated recommendations such as "customers who bought book A also bought book B," and "People who read 'History of Portugal' were also interested in 'Naval History.'" Many database systems use the Apriori algorithm to evaluate frequent item sets for market basket analysis. The Apriori algorithm identifies the individual items that appear the most frequently in a database's item sets, and then extends these frequent individual items to larger and larger item sets, provided that the larger item sets appear sufficiently often in the database's item sets.

Depending on the nature and size of the item sets, a frequent pattern (FP) tree algorithm can execute much faster than the Apriori algorithm executes. The frequent pattern tree algorithm places item sets in a tree, recursively building the tree based on the count for each of the items in the item sets. For each item set, the frequent pattern tree algorithm sorts its items, left to right, in descending order. The frequent pattern tree algorithm identifies the leftmost item with the most item sets, removes this item from the item sets, and represents this item as a root node with the count of all its item sets. Then the frequent pattern tree algorithm recursively looks at the next position in the descending order of items, and finds the most represented remaining item, and represents that item as a child node. The frequent pattern tree algorithm repeats this process, representing more items as child nodes until the frequent pattern tree algorithm is done with the descending order of items, thereby creating a tree in which each original item set is a path in the tree. Then the frequent pattern tree algorithm generates all of the possible item sets by proceeding upward from the leaves in the tree. If the item sets include enough repetition of items, the frequent pattern tree algorithm can execute in memory.

A search box can be a graphical control element used in computer programs, such as file managers, or web browsers, and on web sites. A search box may be a single-line text box with the dedicated function of accepting user input that is used as a query to search a database. Search boxes on web pages can be used to allow users to enter a query to be submitted to a Web search engine server-side script, where an index database is searched for entries that contain one or more of the user's search terms, which may be called query items. Search boxes can be accompanied by a search button, which may be indicated by a magnifying glass symbol, to submit a query for a search. However, the search button can be omitted as the user may press the enter key to submit a query for a search, or the query can be sent automatically to present the user with real-time results. Depending on the particular implementation, a search box may be accompanied by a drop-down list to present the users with past queries or suggested queries. Search boxes can have other features to help the user, such as autocomplete, a spelling checker, etc. Search boxes may also be accompanied by drop-down menus or other input controls to allow the user to restrict the search or choose for which type of content to search. A suggested query drop-down list can show a user shortcuts while a query is entered into a search box. Before the query is completely entered, a drop-down list with the suggested completions may appear to provide options to select. The suggested queries can enable the searcher to complete the required search quickly. As a form of auto completion, the suggested query list is distinct from a search history in that the suggested query list attempts to be predictive even when the user is entering a query for the initial time. Data that supports suggested queries may come from popular searches, sponsors, geographic location, or other sources. These suggested query lists can be used by operating systems, web browsers, and various websites, particularly search engines.

Autocomplete may be a feature in which an application predicts the rest of a word or a query that a user is typing. In graphical user interfaces, users can press the tab key to accept a suggested completion or the down arrow key to accept one of several suggested completions. Autocomplete speeds up human-computer interactions when it correctly predicts the word or query that a user intends to enter after only a few characters have been entered into an input field.

BRIEF DESCRIPTION OF THE DRAWINGS

In the following drawings like reference numbers are used to refer to like elements. Although the following figures depict various examples, the one or more implementations are not limited to the examples depicted in the figures.

DETAILED DESCRIPTION

General Overview

Figure 1:
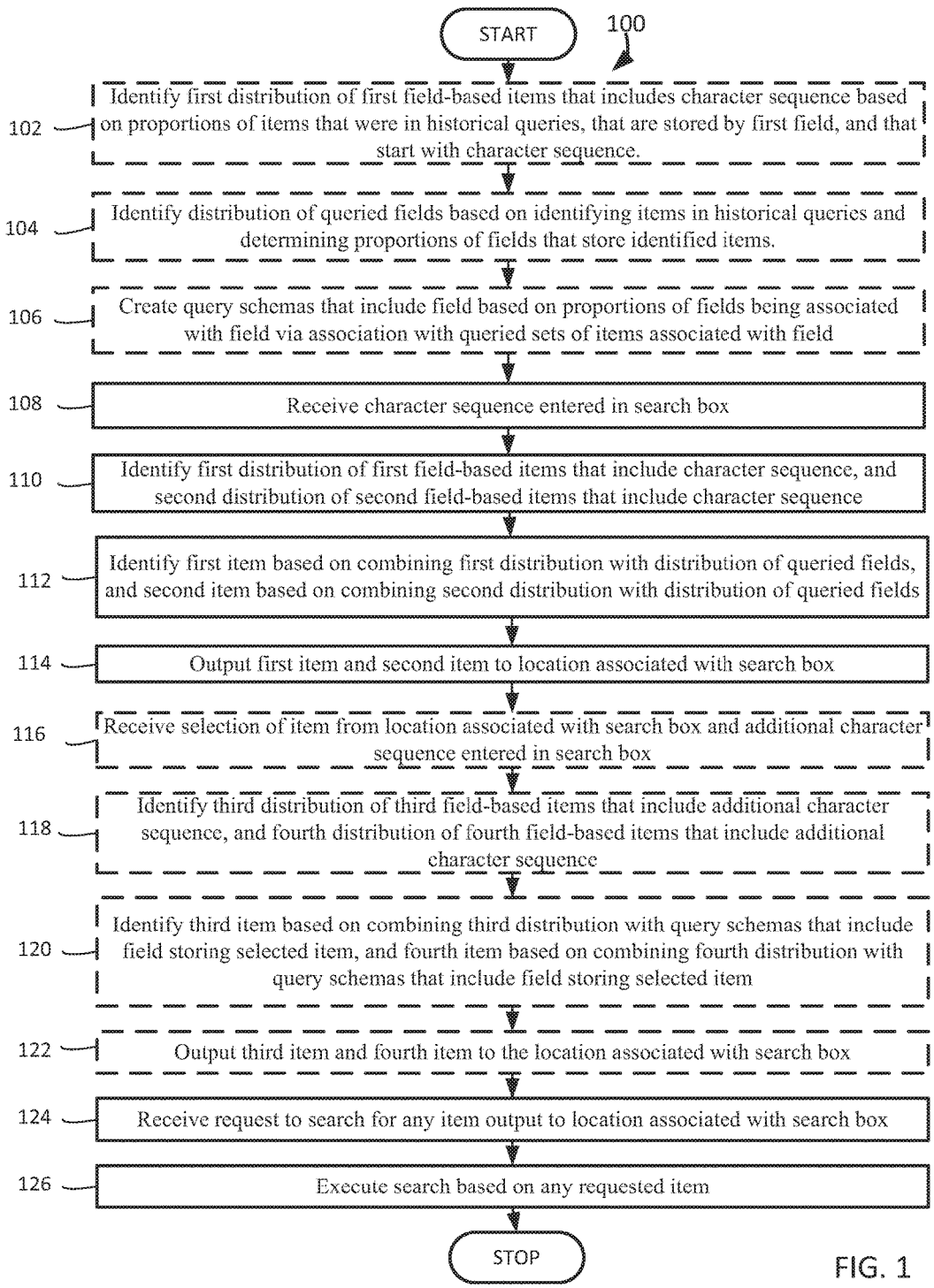
FIG. 1 depicts an operational flow diagram illustrating a high level overview of a method for suggesting query items based on database fields, in an embodiment.

In accordance with embodiments described herein, there are provided methods and systems for suggesting query items based on database fields. After receiving a character sequence entered in a search box, a system identifies a first distribution of first field-based items that include the character sequence, and a second distribution of second field-based items that include the same character sequence. The system identifies a first item based on combining the first distribution with a distribution of queried fields, and a second item based on combining the second distribution with the distribution of queried fields. The system outputs the first item and the second item to a location associated with the search box. Upon receiving a request to search for any item output to the location associated with the search box, the system executes a search based on any requested item.

In an extremely simplified example, when a user enters the letters "co" in the user's search box, a database system identifies that when previous queries for items that started with the letters "co" were for items stored by the database's industry field, 60% of these queries were for "consumer products," 25% of these queries were for "construction," and 15% of these queries were for "computers." The database system also identifies that when queries for items that started with the letters "co" were for items stored by the database's person family name field, 45% of those queries were for "Cooper," 35% of those queries were for "Cook," and 20% of those queries were for "Collins." Then the database system multiplies these specific item percentages by the probabilities that queries were for items stored by various fields, which specify that 30% of all queries were for items stored by the database's industry field and that 40% of all queries were for items stored by the database's person family name field. The largest results of these multiplications enable the database system to select the items that are most likely to be queried when the user entered the letters "co" in the user's search box. These likely items are "consumer products" (60% for this specific industry item multiplied by the 30% probability of a search for the database's industry field equals an 18% result) and "Cooper" (45% for this specific family name item multiplied by the 40% probability of a search for the database's person family name field equals an 18% result). Therefore, the databases system outputs the items "consumer products" and "cooper" as suggested query items to the search box's drop-down list. If the user requests a search for the suggested query item "consumer products" in the drop-down list, then the databases system executes a search for the requested item, "consumer products."

Single box searches has generally been done with the keywords undifferentiated by the types of the keywords. However if a database stores data based on multiple fields, each field with its own characteristics, then a database system can use this field information to improve the search experience. In a real sense, the fields provide the database system with a level of semantic information implying what kinds of things a user might be searching for. Up to this point, searches using multiple fields, rather than using a single box, have frequently used facets and special input fields, such as checkboxes for states or maximum and minimum values for ranges. These queries can be very useful because they can provide the database system with a training set of well annotated data—each query has the search terms as well as the fields which store the search terms. Therefore the database system can start with a set of typed queries, both the search terms and the fields that store the search terms. The database system can break the typed queries into three types of item sets: raw items, fields, and typed items. Raw items can be the terms that users enter in typical single box searches. The database system can derive fields by stripping the items from the fields that store the items, which enables the database system to derive "query schemas" that indicate the fields and the sets of fields for which users are searching. If an item can be stored by more than one field, then, all other things being equal, the item is more likely to be stored by the more likely field. A query schema can be a list of fields that frequently occur together in a query, such as Job Title, Family Name, and Company Name, or Company Name, Industry, and State.

A typed item is the pair of an item and the field that stores the item, such as (Bank, Company Name) and (John, Given Name). Note that an item may be associated with a set of typed items, such as (Bank, Company Name), (Bank, Industry), and (Bank, Street Address). Given a set of queries, the database system processes the set to derive the sets described above for raw items, fields, and typed items. In particular, the fields provide the database system with a prior distribution over the likely fields being searched.

The database system receives a character at a time and suggests items based on the received characters. Given a character sequence, which may be referred to as a prefix, the database system can identify a set of items that correspond to the character sequence, and from these items the database system can identify the fields that store each of the items. At any point the database system has a distribution over some previous accepted input, which may be empty, and a character sequence of 0 or more characters. An example of a previously accepted empty input and a character sequence of 0 characters is " ". An example of a previously accepted empty input and a character sequence of 3 characters is "joh". An example of a previously accepted input that is not empty and a character sequence of 0 characters is "John". An example of a previously accepted input that is not empty and a character sequence of 2 characters is "John Sm". Note that if a user types "joh", then the database system can suggest items such as "John Smith" and "John Doe". At this point the user can accept "John Doe", which is then the previously accepted input. The database system can then make suggestions such as "John Doe Accountant" and "John Doe Lawyer". If the user then enters the character "p" instead of accepting a suggestion, the database system has a character sequence of 1 character, and can make additional suggestions, such as "John Doe Policeman" and "John Doe Pastry chef". If the user then enters the character "o", such that the character sequence becomes "po", the database system can make further suggestions, such as "John Doe Policeman" and "John Doe Pocanoes". The previous accepted input can be a set of typed item sets, an item set of accepted items and the fields that store these items. While the item sets are definitive—the user has accepted them—the fields may not be, as a particular item can be stored by two or more fields. Once a user enters some input, this immediately provides the database system with a set of possible items. The previous input also provides the database system with a distribution over potential fields, based on the fields seen so far and potential field item sets from the training set, and over potential tokens, based on the typed item sets seen so far.

So given some character sequence, the database system has a set of potential items taken from the items that appear in item sets from the training set and items that do not appear in item sets in the training set with the appropriate types. For items that appear in item sets from the training set corresponding to field item sets predicted by previously seen fields, the likelihood of the item set is the occurrences of this type of item set among all item sets containing the typed items previously seen. For items that do not appear in item sets in the training set with the appropriate types, there may be a typed item corresponding to a field in a seen field item set from the training set. Suppose the database system trained on a set of existing queries, but no previous user has ever queried for "xyzabc computers." If a user enters the character sequence "xyz," there is no example in the query set. However, this is a prefix of an item still in the database. So the database system can calculate the item's likelihood using the likelihood of the field at this point in the query (as described above) and using the number of times this item (xyzabc) is stored in that field in the database, as opposed to just appearing in queries, which will almost necessarily be a smaller number. Here the likelihood is the likelihood of the item stored by the field multiplied by the likelihood of the field among the typed item sets.

Systems and methods are provided for suggesting query items based on database fields. As used herein, the term multi-tenant database system refers to those systems in which various elements of hardware and software of the database system may be shared by one or more customers. For example, a given application server may simultaneously process requests for a great number of customers, and a given database table may store rows for a potentially much greater number of customers. As used herein, the term query plan refers to a set of steps used to access information in a database system. Next, methods and mechanisms for suggesting query items based on database fields will be described with reference to example embodiments. The following detailed description will describe methods for suggesting query items based on database fields, and then describe an extremely simplified example of item sets and an array for suggesting query items based on database fields.

While one or more implementations and techniques are described with reference to an embodiment in which suggesting query items based on database fields is implemented in a system having an application server providing a front end for an on-demand database service capable of supporting multiple tenants, the one or more implementations and techniques are not limited to multi-tenant databases nor deployment on application servers. Embodiments may be practiced using other database architectures, i.e., ORACLE®, DB2® by IBM and the like without departing from the scope of the embodiments claimed.

Any of the embodiments described herein may be used alone or together with one another in any combination. The one or more implementations encompassed within this specification may also include embodiments that are only partially mentioned or alluded to or are not mentioned or alluded to at all in this brief summary or in the abstract. Although various embodiments may have been motivated by various deficiencies with the prior art, which may be discussed or alluded to in one or more places in the specification, the embodiments do not necessarily address any of these deficiencies. In other words, different embodiments may address different deficiencies that may be discussed in the specification. Some embodiments may only partially address some deficiencies or just one deficiency that may be discussed in the specification, and some embodiments may not address any of these deficiencies.

FIG. 1 depicts an operational flow diagram illustrating a high level overview of a method 100 for suggesting query items based on database fields. The method 100 may be implemented on either a centralized computing platform or in parallel on a distributed computing platform, such as on Map/Reduce or Spark.

The system may identify a first distribution of first field-based items that includes a specific character sequence based on proportions of items that were in historical queries, that are stored by a first field, and that start with the character sequence, box 102. The system identifies possibilities that different fields store items that have a user-entered character sequence. For example and without limitation, this can include the database system identifying previous queries that were for items that started with the letters "co," when these items were identified as being stored in the database's industry field. Further to this example, the database system also identifies that 60% of these queries were for "consumer products," 25% of these queries were for "construction," and 15% of these queries were for "computers." While this example describes the database system identifying a distribution of field-based items that begin with the user-entered character sequence, the database system may identify distributions of field-based items that include but do not begin with the user-entered character sequence, such as the item "supercomputer" that includes but does not begin with the character sequence "co." In another example, the database system identifies that when previous queries were for items that started with the letters "te" and were stored by the database's state field, 80% of those queries were for "Texas" and 20% of those queries were for "Tennessee."

Aspects of the database system are described below in reference to FIG. 4 and FIG. 5. A distribution can be the way in which something is shared out among a group. A field can be a part of a record, which represents an item of data, such as records in a database that have an industry field that stores industry data for its record. A character sequence can be part or all of an ordered group of symbols, such as the letters "co" and the letters "computer." A proportion can be a part, share, or number considered in comparative relation to a whole. An item can be anything that a database system can associate with a database system user, such as a search term, a contact, an account, a lead, an opportunity, a product, a service, or any digital object. A historical query can be a previous question addressed to a system. A field-based item can be a collection of entities that is grouped together because these entities are stored by corresponding parts of records.

In addition to identifying distributions of field-based items, the system can identify a distribution of queried fields based on identifying items in historical queries, and determining proportions of fields that store the identified items, box 104. The system identifies the probabilities that previous queries were for items stored by various fields. By way of example and without limitation, this can include the database system identifying a distribution of queried fields by identifying that 45% of all queries were for items stored by the database's company name field, 40% of all queries were for items stored by the database's person family name field, 30% of all queries were for items stored by the database's industry field, 25% of all queries were for items stored by the database's state field, 20% of all queries were for items stored by the database's city field, and 15% of all queries were for items stored by the database's person job title field.

The sum of the percentages in this example is a total that is more than 100% because many queries were for multiple items that were stored by different database fields. While this example describes the database system identifying a distribution of 6 queried database fields, the database system can identify a distribution of any number of queried database fields. A distribution of queried fields can be the way in which aspects of questions are shared out among parts of records, which represent items of data.

Similar to identifying a distribution of queried fields, the system may identify query schemas that include a specific field based on proportions of fields being associated with the specific field via association with queried sets of items associated with the specific field, box 106. The system identifies fields that frequently store items for the same query, so that the system can suggest more likely query items when one of these fields is identified as likely storing an item selected for a current query. In embodiments, this can include the database system identifying a query schema which specifies that 80% of all queries for items stored by the database's industry field also included an item stored by the database system's company name field, and specifies that 60% of all queries for items stored by the database's industry field also included an item stored by the database system's city field. In contrast, only 45% of all queries were for items stored by the database's company name field and only 20% of all queries were for items stored by the database's city field. When a user selects to include an item stored by the database's industry field in a query, the probabilities increase significantly that other items in the query will be stored by the database's company name field and/or city field. Consequently, the database system identifies a query schema that increases the likelihood of suggesting an item stored by the database system's company name field and/or an item stored by the database system's city field when the database system determines that the database's industry field likely stores an item selected for a current query. Once the database system identifies a current query item as being stored by a specific field, the database system can identify the other fields that frequently store items for the same query, and uses the probabilities that other items for the current query are stored by these other fields to suggest more likely query items. Another way of getting at this is that users generally either look for a particular company in an area or look for all the companies in an area with a particular industry. Therefore, once a user specifies an industry, it is very unlikely that the user enters a name or a street, while if the user enters a name, it is very likely that the user enters a state or a street.

While this example describes the database system identifying query schemas that include 2 database fields, the database system can identify query schemas that include any number of database fields. A query schema can be a model of a theory about questions addressed to a system. A queried set of items can be any group or collection of entities that form the basis for a question addressed to a system. The method 200 described below and depicted in FIG. 2 details how the database system can identify frequent item sets that include an identified item.

A system receives a character sequence entered in a search box, box 108. The system suggests query items based on a user-entered character sequence. For example and without limitation, this can include the database system receiving a user's entry of the letters "co" in the user's search box. As indicated above, a search box can be a graphical control element used by computer programs, with the dedicated function of accepting user input that is used as a query to search a database. A user may use tactile input, such as a keyboard or touchpad, and/or an audio input, such as speaking to a microphone that communicates with a speech-to-text application, to enter a character sequence in a search box.

Once a character sequence is received, the system identifies a first distribution of first field-based items that include the user-entered character sequence, and a second distribution of second field-based items that include the same character sequence, box 110. The system identifies when previous queries for items that started with the user-entered character sequence were stored by a specific database field, what percentage of these queries were for which specific items. By way of example and without limitation, this can include the database system identifying that when previous queries for items that started with the letters "co" were for items stored by the database's industry field, 60% of these queries were for "consumer products," 25% of these queries were for "construction," and 15% of these queries were for "computers." Further to this example, the database system also identifies that when queries for items that started with the letters "co" were for items stored by the database's person family name field, 45% of those queries were for "Cooper," 35% of those queries were for "Cook," and 20% of those queries were for "Collins." Continuing this example, the database system identifies that when previous queries for items that started with the letters "co" were for items stored by the database's company name field, 30% of these queries were for "Conoco," 25% of these queries were for "Costco," 25% of these queries were for "Coca Cola," and 20% of these queries were for "Colgate." Additionally for this example, the database system identifies that when queries for items that started with the letters "co" were for items stored by the database's state field, 60% of those queries were for "Colorado" and 40% of those queries were for "Connecticut." Also for this example, the database system identifies that when previous queries for items that started with the letters "co" were for items stored by the database's city field, 45% of these queries were for "Columbus," 35% of these queries were for "Columbia," and 20% of these queries were for "Colorado Springs." Furthermore for this example, the database system identifies that when queries for items that started with the letters "co" were for items stored by the database's job title field, 75% of those queries were for "consultant" and 25% of those queries were for "cook." In these examples, the item cook is stored by both the database system's person family name field and the database system's job title field, as the same item may be stored by different fields.

The database system can maintain a map from each character sequence, such as "co," which may be referred to as a prefix, to each corresponding item, such as "consumer products," "construction," "computers," "Cooper," "Cook," and "Collins." Since users may not have searched for every item in the database, the database system can maintain a map for all character sequences that correspond to all database items, whether or not any user has searched for the database item. The database system may use a hash schema that enables the database system to receive a character sequence and then quickly identify corresponding items.

After identifying distributions of field-based items that include the user-entered character sequence, the system identifies a first item based on combining a distribution of queried fields with the first distribution of first field-based items, and a second item based on combining the distribution of queried fields with the second distribution of second field-based items, box 112. The system identifies items that are most likely to be query items based on database fields associated with a user-entered character sequence. In embodiments, this can include the database system multiplying specific item percentages by the probabilities that queries were for items stored by various fields. For this example, these probabilities specify that 45% of all queries were for items stored by the database's company name field, 40% of all queries were for items stored by the database's person family name field, 30% of all queries were for items stored by the database's industry field, 25% of all queries were for items stored by the database's state field, 20% of all queries were for items stored by the database's city field, and 15% of all queries were for items stored by the database's person job title field. Continuing this example, the largest results of these multiplications enable the database system to select the items that are most likely to be queried when the user enters the letters "co" in the user's search box. In this example, these items are "consumer products" (60% for this specific industry item multiplied by the 30% probability of a search for the database's industry field equals an 18% result) and "Cooper" (45% for this specific family name item multiplied by the 40% probability of a search for the database's person family name field equals an 18% result). Although this example describes the database system identifying two items, the database system may identify any number of items.

The database system may identify the first item and the second item based on the first item and the second item being associated with corresponding item proportions that are larger than corresponding item proportions associated with different items. For example, the database system identifies "consumer products" (60%*30%=18%) and "Cooper" (45%*40%=18%) as the most likely query items instead of identifying Cook (35%*40%=14%), Collins (20%*40%=8%), construction (25%*30%=7.5%), computers (15%*30%=4.5%), "Conoco" (30%*45%=13.5%), "Costco" (25%*45%=11.25%), "Coca Cola" (25%*45%=11.25%), "Colgate" (20%*45%=9%), "Colorado" (60%*25%=15%), "Connecticut" (40%*25%=10%), "Columbus" (45%*20%=9%), "Columbia" (35%*20%=7%), "Colorado Springs" (20%*20%=4%), "consultant" (75%*15%=11.25%), or "cook" (25%*15%=3.75%).

After identifying the first item and the second item as the most likely query items, the system outputs the first item and the second item to a location associated with the search box, box 114. The system suggests query items based on database fields associated with a user-entered character sequence. In embodiments, this can include the database system outputting the items "consumer products" and "cooper" to the search box's drop-down list. A location associated with a search box can be a drop-down list that is visually proximate to the search box, or a position within a sufficiently large search box itself.

Having output suggested query items, the system may receive a selection of an item from the location associated with the search box and may receive an additional character sequence entered in the search box, box 116. The system enables the user to accept a suggested query item and to enter additional characters for additional query items. For example and without limitation, this can include the database system receiving the user's selection of the suggested query item "consumer products" and also receiving the letters "te" that the user entered after the selection of "consumer products." The database system enabled the user to enter only two letters, "co," and select the suggested query item "consumer products," instead of requiring the user to enter the 17 characters for the query item "consumer products." A selection of an item can be made by a user positioning an indicator, a pointer, or a cursor at a location where the item is displayed on a user interface, or by the user's audio command via a microphone. Even though this example describes the database system enabling the user to select an item from suggested query items and entering an additional character sequence one time prior to executing a search based on a requested item, the database system may enable the user to select items from output items and enter additional character sequences any number of times prior to executing a search based on a requested item.

If the system receives an additional user-entered character sequence, the system may identify a third distribution of third field-based items that include the additional character sequence and a fourth distribution of fourth field-based items that include the same additional character sequence, box 118. The system identifies when previous queries for items that started with an additional user-entered character sequence were stored by a specific database field, what percentage of these queries were for which specific items. By way of example and without limitation, this can include the database system identifying that when previous queries for items that started with the letters "te" were for items stored by the database's industry field, 55% of these queries were for "technology" and 45% of these queries were for "telecommunications." Further to this example, the database system identifies that when previous queries for items that started with the letters "te" were for items stored by the database's person family name field, 45% of those queries were for "Terry," 40% of those queries were for "Tennant," and 15% of those queries were for "Temple." Continuing this example, the database system identifies that when previous queries for items that started with the letters "te" were for items stored by the database's company name field, 70% of these queries were for "Texas Instruments," 15% of these queries were for "Tesla," and 15% of these queries were for "Tech Data." Additionally to this example, the database system identifies that when previous queries for items that started with the letters "te" were for items stored by the database's state field, 80% of those queries were for "Texas" and 20% of those queries were for "Tennessee." Furthermore to this example, the database system identifies that when previous queries for items that started with the letters "te" were for items stored by the database's city field, 45% of these queries were for "Tempe," 35% of these queries were for "Texarkana," and 20% of these queries were for "Temple." Also for this example, the database system identifies that when previous queries for items that started with the letters "te" were for items stored by the database's job title field, 75% of those queries were for "technician" and 25% of those queries were for "teller." In these examples, the item "temple" is stored by both the database system's person family name field and the database system's city field, as the same item may be stored by different fields.

If the system identifies distributions of field-based items based on an additional user-entered character sequence, the system identifies a third item based on combining query schemas that include a field storing the selected item with the third distribution of third field-based items, and a fourth item based on combining the query schemas that include the field storing the selected item with the fourth distribution of fourth field-based items, box 120. The system identifies items that are most likely to be query items based on any selected items and the database fields associated with any additional character sequences. In embodiments, this can include the database system multiplying specific item percentages by query schema probabilities that queries were for items stored by various fields associated with a field that stores a user-selected item. Continuing this example, since the database system has identified the user-selected "consumer products" as being stored by the database's industry field, the database system uses the query schema probabilities that identify which fields are most likely to store items that are included in a query for an item that is stored by the database's industry field. Further to this example, the database system uses the query schema that is specific to queries that include an item stored by the database's industry field. Additionally for this example, instead of using the general query probabilities based on all queries, the database system uses the specific query schema probabilities which specify that 80% of all queries for items stored by the database's industry field also included an item stored by the database system's company name field, and specify that 60% of all queries for items stored by the database's industry field also included an item stored by the database system's city field. Furthermore for this example, the largest results of these multiplications enable the database system to select the items that are most likely to be queried when the user enters the letters "te" in the user's search box. In this example, these items are "Texas Instruments" (70% for this specific company item multiplied by the 80% probability of a search for the database's company name field equals a 56% result) and "Tempe" (45% for this specific city item multiplied by the 60% probability of a search for the database's city field equals a 27% result). Although this example describes the database system identifying two items, the database system may identify any number of items.

The preceding example of the database system identifying additional items based on combining query schemas that include a field storing a selected item with the distributions of additional field-based items is a simplified example because the user-selected item "consumer products" is only stored by one database field, the database's industry field. If the user had selected an item that is stored by multiple different database fields, such as the item "cook" or the item "temple," then the database system's combinations of query schemas that include these different fields with the distributions of the field-based items would be more complex. For example, the user may select the suggested query item "cook," which is stored by both the person family name field and the person job title field. If the user selected "cook," the database system may identify additional items by combining the query schemas that include the person family name field with the distributions of additional field-based items that start with the letters "te," and may identify additional items by combining the query schemas that include the person job title field with the distributions of additional field-based items that start with the letters "te." Then the database system may aggregate the additional items identified by using the query schema that includes the person family name field, which may include items stored by the person job title field, with the additional items identified by using the query schema that includes the person job title field, which may include items stored by the person family name field. The database system may aggregate additional items identified by using query schemas that include different database fields by weighing corresponding identified items by the likelihood that the items are stored by various database fields. For example, the database system may assign a weight to items identified using the query schemas that include the person family name field based on the likelihood that "cook" is a family name, and may assign a weight to items identified using the query schemas that include the person job title field based on the likelihood that "cook" is a job title.

The database system may identify the third item and the fourth item based on the third item and the fourth item being associated with corresponding item proportions that are larger than corresponding item proportions associated with different items. For example, the database system identifies "Texas Instruments" (70%*80%=56%) and "Tempe" (45%*60%=27%) as the most likely query items instead of identifying "Tesla" (15%*80%=12%), "Tech Data" (15%*80%=12%), "Texarkana" (35%*60%=21%), or "Temple" (20%*60%=12%), If the database system identifies the third item and the fourth item as likely query terms, the system outputs the third item and the fourth item to the location associated with the search box, box 122. The system suggests query items based on database fields associated with additional user-entered character sequences. For example and without limitation, this can include the database system outputting the items "Texas Instruments" and "Tempe" to the search box's drop-down list. Even though this example describes the database system outputting suggested query items two times prior to executing a search based on a requested item, the database system may output suggested query items any number of times prior to executing a search based on the requested item. Although this example describes the database system outputting two items, the database system may output any number of items.

Having output suggested query items, the system receives a request to search for any item output to the location associated with the search box, box 124. The system receives requests to search for a suggested query item. By way of example and without limitation, this can include the database system receiving the user's request to search for the suggested query item "consumer products." In another example, the database system receives the user's request to search for the suggested query item "Texas Instruments," which requires that the search also includes the user-selected suggested query item "consumer products" that precedes the suggested query item "Texas Instruments." The database system enabled the user to enter only two letters, "co," and select the suggested query item "consumer products," and then enter only two more letters, "te," and request a search that includes the suggested query items "consumer products Texas Instruments," instead of entering the 35 characters for the query items "consumer products Texas Instruments."

Upon receiving a request to search for any item, the system executes a search based on any requested item, box 126. The system searches for query items that were suggested based on database fields associated with any user-entered character sequences. In embodiments, this can include the database system executing a search for the requested item "consumer products." In another example, the database system executes a search for the requested items "consumer products Texas Instruments." A search can be a database system discovering information for retrieval and presentation in response to a user query, based on the user's query items. The database system may store preprocessed search results for some frequent queries, such that the database system can more quickly transmit the search results to any user selecting the corresponding suggested query items. For example, the database system caches the search results for a search in response to the suggested query items "consumer products Texas Instruments" because the item set count for the item set "consumer products Texas Instruments" indicates that "consumer products Texas Instruments" is one of the most frequent item sets that is the basis for a search.

The method 100 may be repeated as desired. Although this disclosure describes the blocks 102-126 executing in a particular order, the blocks 102-126 may be executed in a different order. In other implementations, each of the blocks 102-126 may also be executed in combination with other blocks and/or some blocks may be divided into a different set of blocks.

Figure 2:
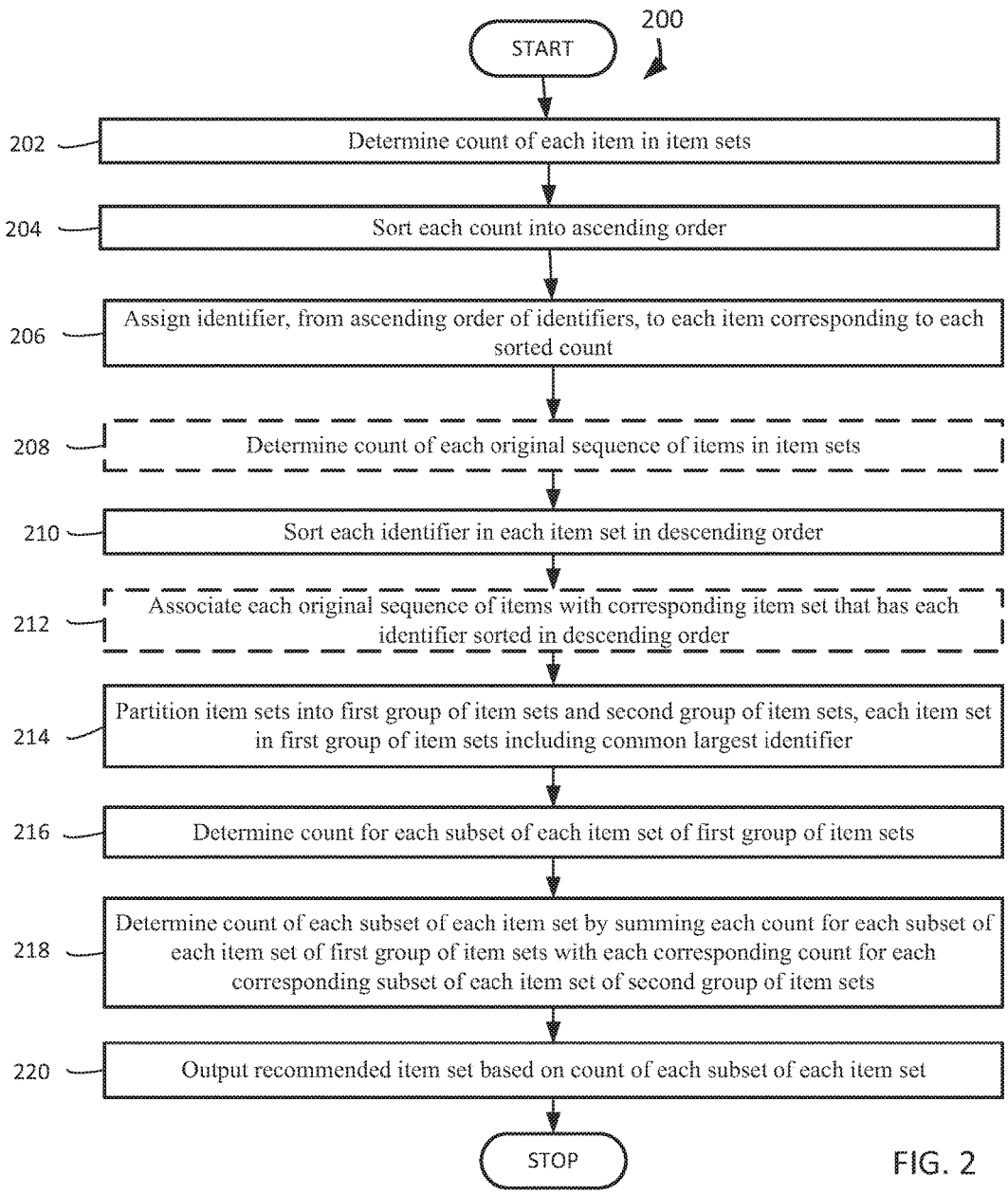
FIG. 2 depicts an operational flow diagram illustrating a high level overview of another method for suggesting query items based on database fields, in an embodiment.

FIG. 2 depicts an operational flow diagram illustrating a high level overview of a method 200 for suggesting query items based on frequent item sets. The method 200 may be implemented on either a centralized computing platform or in parallel on a distributed computing platform, such as on Map/Reduce or Spark. As a brief overview, a database system has a set of items with counts, such as Contact A with a count of 6, Contact B with a count of 5, Contact C with a Count of 4, and Contact D with a count of 5. The database system has both the tuple (A, C, B) and the tuple (C, A, D), and needs to sort these tuples to run through the tuples and export tuples and counts. To do that, the database system labels each item, and that labeling has two requirements. The labeling respects the counts of each item, i.e., if count(A) >count(B), then label(A)>label(B). The labeling is total, so for any items J and K, either label(J)>label(K) or label(K) >label(J), even if count(J)=count(K). The second requirement means that the labeling must be a total order. The reason it must be total order is that when the database system is done sorting, all the (A, B, C) tuples must be together and all the (A, D, C) tuples must be together, even if count(D) =count(B). The database system can reverse the ordering between labels, as long as the database system does it everywhere. If the database system doesn't make it a total order (i.e., just uses counts) then the database system can't separate B's and D's.

A system determines a count of each item in multiple item sets, block 202. A count quantifies the total occurrences, or support level, for each corresponding item in the sets. For example and without limitation, this can include the database system determining the count of 6 for Contact A, the count of 5 for Contact B, and the count of 4 for Contact C from the item sets (Contact A, Contact B), (Contact C, Contact A), (Contact C, Contact B, Contact A), (Contact B, Contact C), (Contact B, Contact A), (Contact A, Contact B, Contact C), and (Contact A). Although this example describes the database system counting each item in each of the item sets, the database system may count each item in a limited amount of the item sets. For example, the database system can only count the contacts in item sets that were recorded in the most recent 5 years so that the database system does not make recommendations based on contacts that were recorded more than 5 years ago. Aspects of the database system are described below in reference to FIG. 4 and FIG. 5. A count can be a measure or a number of an item, such as 6 occurrences of Contact A in a collection of item sets, or the 7 times that a system user submitted a specific type of query that included the word "James." A set of items can be any group or collection of entities that are associated with a specific user at a period in time. Examples of item sets include the 9 contacts that an organization member purchased on Monday, the 10 contacts that the organization member purchased on Tuesday, the 8 contacts that the organization member searched for on Tuesday, the 13 accounts that an organization purchased on Wednesday morning, the 12 accounts that the organization purchased on Wednesday afternoon, and the 11 accounts that the organization searched for on Wednesday night.

After determining the count of each item, the system sorts each count into an ascending order, block 204. Sorting the counts of items enables the database system to identify items based on the frequency of the items' occurrences. By way of example and without limitation, this can include the database system sorting the count of 6, the count of 5, and the count of 4 into the ascending order of the count of 4, the count of 5, and the count of 6. Although this example describes the database system sorting counts in an ascending order, the database system can sort counts in a descending order. For example, the database system can sort the count of 4, the count of 5, and the count of 6 into the descending order of the count of 6, the count of 5, and the count of 4. Although not every item may have a unique count, the database system sorts the counts of items into a canonical ordering that provides a unique sorting order. Sorting can be to arrange systematically in a prescribed sequence, such as sorting a smaller number before a larger number. An ascending order can be an increasing sequence, such as the numbers 1, 2, and 3.

Having uniquely sorted the counts, the system assigns an identifier, from identifiers in an ascending order, to each item corresponding to each sorted count, block 206. The unique sorting order enables the database system to assign different identifiers to different items that have the same count, and assigning identifiers to items enables the database system to uniformly sort the items by sorting the identifiers. In embodiments, this can include the database system assigning identifier 1 to each Contact C, which corresponds to the count of 4, identifier 2 to each Contact B, which corresponds to the count of 5, and identifier 3 to each Contact A, which corresponds to the count of 6. Although this example describes the database system assigning increasing identifiers to the sorted counts, the database system can assign decreasing identifiers to the sorted accounts. For example, the database system assigns identifier 3 to each Contact C, which corresponds to the count of 4, identifier 2 to each Contact B, which corresponds to the count of 5, and identifier 1 to each Contact A, which corresponds to the count of 6. Assigning can be allocating or designating an identifier as a reference to a count, such as assigning the identifier 1 to each Contact C, which corresponds to the count of 4. An identifier can be a whole number used to reference a count, such as identifier 1 is the numeral 1 that is assigned to refer to the count of 4, as the identifiers need to be sortable.

Assigning can be allocating or designating an identifier as a reference to an item. For example, the database system temporarily replaces items in the item set (Contact A, Contact B, Contact C) with the identifiers 1, 2, and 3 to result in the set (identifier 3, identifier 2, identifier 1). In another example, the database system creates a temporary set (identifier 3, identifier 2, identifier 1) that is assigned to the item set (Contact A, Contact B, Contact C). In yet another example, the database system modifies the item set (Contact A, Contact B, Contact C) into the item set (Contact A, identifier 3; Contact B, identifier 2; Contact C, identifier 1).

Having assigned identifiers to set's items, the system optionally determines a count of each original sequence of items in multiple item sets, block 208. The count of each original sequence enables the database system to track the original listed order of the items in each item set. By way of example and without limitation, this can include the database system determining a count of 1 for the item set (Contact C, Contact B, Contact A) and determining a separate count of 1 for the item set (Contact A, Contact B, Contact C), and assigning a unique sequence identifier to each of these item sets. For each original sequence of items, the database system records the unique sequence identifier, the count of the original sequence of items, and the set of identifiers for the original sequence of items, with the set of identifiers sorted in descending order, as described below. The database system might record this information for an original sequence of items only if the count for the original sequence of items exceeds a threshold. An original sequence of items can be all of the items in an item set, listed in the order in which all of the items initially appeared in the item set. For example, the item set (Contact C, Contact B, Contact A) and the item set (Contact A, Contact B, Contact C) both contain only the same 3 items. However, since the items are listed in a different order in these two item sets, the database system counts each of these item sets separately as two different original sequences of items.

While the order in which contacts are listed may not appear to be significant, the order of other items in an item set may be significant enough to justify tracking the order of items in the item sets. For example, a user searches for potential contacts by submitting the search queries "San Francisco computer sales James Jordan" and "San Francisco computer sales Jordan James." If the database system does not retain the order of the search terms, the database system may interpret these two sets of search terms as the same two searches for the same person who sells computers in San Francisco and who has the names of James and Jordan. If the database system retains the order of the search terms, the database system may interpret these two sets of search terms as searches for two different people who sell computers in San Francisco, one who has the given name of James and the family name of Jordan, and the other who has the given name of Jordan and the family name of James. In some embodiments, the database system retains an original sequence of an item set only if the count of the original sequence of the item set exceeds a threshold count, such that the original sequence of infrequently occurring item sets is not retained. There is a constant question of when data is significant. If a system records 100 million queries, then items that are queried only once or twice may not be worth considering as significant enough to suggest.

After assigning identifiers to set's items, and possibly tracking the original sequence of the items, the system sorts each identifier in each item set in descending order, block 210. Sorting identifiers in each set enables the database system to directly compare sets. In embodiments, this can include the database system sorting each identifier in each set in descending order, such as sorting the set (identifier 1, identifier 2, identifier 3) into the set (identifier 3, identifier 2, identifier 1) in descending order. Although this example describes the database system sorting each item set's identifiers in descending order, the database system can sort each item set's identifiers in ascending order. For example, the database system can sort the set (identifier 3, identifier 2, identifier 1) into the set (identifier 1, identifier 2, identifier 3) in ascending order. Descending order can be a decreasing sequence, such as the numbers 3, 2, and 1.

Having sorted each item sets' identifiers in descending order, the system optionally associates each original sequence of items with a corresponding item set that has each identifier sorted in descending order, block 212. The database system maps an item set to its original sequence of items, which will eventually enable the database system to make a recommendation using the original order of the items in an item set when the database system makes a recommendation based on the item set. For example and without limitation, this can include the database system mapping the item set (identifier 3, identifier 2, identifier 1), which corresponds to the sorted descending order of the items in the item set, to the item set (identifier 1, identifier 2, identifier 3), which corresponds to the original order of the items in the item set. Associating can be connecting or linking an item set with its original sequence of items, such as connecting the item set (identifier 3, identifier 2, identifier 1) with the original order item set (identifier 1, identifier 2, identifier 3).

After sorting each item sets' identifiers in descending order, the system partitions the item sets into a first group of item sets and a second group of item sets, with each item set in the first group of item sets including a common largest identifier, block 214. Partitioning the item sets into groups enables the database system to efficiently determine counts of item sets and subsets from a group of similar item sets. By way of example and without limitation, this can include the database system partitioning the identifiers sets into a first group that includes identifier 3 as the common largest identifier: (identifier 3, identifier 2, identifier 1), (identifier 3, identifier 2, identifier 1), (identifier 3, identifier 2), (identifier 3, identifier 2), (identifier 3, identifier 1), and (identifier 3) and a second group that has identifier 2 as the common largest identifier: (identifier 2, identifier 1). Although this example describes the database system partitioning item sets into groups of item sets based on a common largest identifier, the database system may partition item sets into groups of item sets based on a common smallest identifier. Upon partitioning the item sets into the first group of item sets, the database system may sort items in the first group of item sets.

A description of sorting items in a group of item sets is described below in reference to FIGS. 3A-B. Partitioning item sets into groups of item sets can be dividing, distributing, or separating item sets into mutually exclusive parts or portions, such as putting all item sets that have the identifier 3 as their common largest identifier into one collection of item sets, and putting all item sets that have the identifier 2 as their common largest identifier into another collection of item sets. In another example, all item sets that have the identifier 3 as their common smallest identifier are put into one collection of item sets, and all item sets that have the identifier 2 as their common smallest identifier are put into another collection of item sets. A group of item sets can be a collection or aggregation of item sets, such as the first group of item sets that have the identifier 3 as their largest identifier. A common largest identifier included in a group of items sets can be an identifier that has the largest value in each of the group's item sets, such as identifier 3 is the numerically biggest identifier in the first group of item sets.

Having partitioned the item sets into groups of item sets, the system determines a count for each subset of each item set of the first group of item sets, block 216. Determining the counts of subsets of item sets for one group of item sets enables the database system to aggregate all such counts for all such subsets for all such groups. In embodiments, this can include the database system determining the count of 2 for the subset (identifier 3, identifier 2, identifier 1), determining the count of 4 for the subset (identifier 3, identifier 2), determining the count of 3 for the subset (identifier 3, identifier 1), determining the count of 6 for the subset (identifier 3), determining the count of 2 for the subset (identifier 2, identifier 1), determining the count of 4 for the subset (identifier 2), and determining the count of 3 for the subset (identifier 1). Similarly, the database system determines the count of 1 for the subset (identifier 2, identifier 1), the count of 1 for the subset (identifier 2), and the count of 1 for the subset (identifier 1). A subset of items can be any or every part or portion of a collection or set of items, such as the subset (identifier 1) is a subset of the set (identifier 3, identifier 2, identifier 1), and the subset (identifier 3, identifier 2, identifier 1) is a subset of the set (identifier 3, identifier 2, identifier 1). Consequently, the database system can aggregate 3 counts of the subset (identifier 3, identifier 1) from 1 count of the subset (identifier 3, identifier 1) and 2 counts of the subset (identifier 3, identifier 2, identifier 1). A method of determining a count for each subset of each item set in a group of item sets is described below in reference to FIG. 3 B.

After determining the count for each subset of each item set of the first group of item sets, the system determines the count of each subset of each item set by summing each count for each subset of each item set of the first group of item sets with each corresponding count for each corresponding subset of each item set of the second group of item sets, block 218. Determining the counts of each subset of each item set enables the database system to make recommendations based on these counts. For example and without limitation, this can include the database system summing the counts of the subsets for the groups, resulting in the count of 2 for the subset (identifier 3, identifier 2, identifier 1), the count of 4 for the subset (identifier 3, identifier 2), the count of 3 for the subset (identifier 3, identifier 1), the count of 6 for the subset (identifier 3), the count of 3 for the subset (identifier 2, identifier 1), the count of 5 for the subset (identifier 2), and the count of 4 for the subset (identifier 1). Summing counts can be adding or aggregating the counts to produce a combined result, such as adding the count of 2 for the subset (identifier 2, identifier 1) from the first group to the count of 1 for the subset (identifier 2, identifier 1) from the second group to result in the count of 3 for the subset (identifier 2, identifier 1) from both groups. The database system identifies frequent item sets faster than the Apriori algorithm identifies frequent item sets because the database system starts with item sets and then identifies subsets of the item sets, whereas the Apriori algorithm starts with individual items and then gradually extends these individual items to larger and larger item sets.

The database system may retain only item sets and/or items with sufficient support, which are item sets and/or items that occur more than a corresponding minimum threshold amount. Once the database system determines the support for each individual item, the database system may delete items that have insufficient support from their corresponding item sets. Additionally or alternatively, once the database system determines the support for each item set, the database system may delete item sets that have insufficient support.

Having determined the count of each subset of each item set, the system outputs a recommended item set based on the count of each subset of each item set, block 220. By way of example and without limitation, this can include the database system outputting a recommended item set (Contact B) to a system user who already purchased Contact A, because 4 of the 6 (66.6%) item sets that included Contact A also included Contact B, thereby exceeding the recommendation threshold of 60%. While some embodiments may also include (Contact C) in the recommended item set, other embodiments do not include (Contact C) in the recommended item set because only 3 of the 6 (50.0%) item sets that included Contact A also included Contact C, thereby failing to meet the recommendation threshold of 60%. In another example, the database system responds to a user's initial search terms set (San Francisco computer sales) by outputting a recommended item set (James Jordan) because most of the previous search term sets that included the search terms (San Francisco computer sales) also included the search terms (James Jordan). However, the database system does not list the recommended set as (Jordan James) because most of the search term sets that include the search terms (San Francisco computer sales James Jordan) list a search term order in which "James" is listed before "Jordan."

The method 200 may be repeated as desired. Although this disclosure describes the blocks 202-220 executing in a particular order, the blocks 202-220 may be executed in a different order. In other implementations, each of the blocks 202-220 may also be executed in combination with other blocks and/or some blocks may be divided into a different set of blocks. Each of the blocks 202-220 may be implemented on either a centralized computing platform or in parallel on a distributed computing platform.

Figure 3:
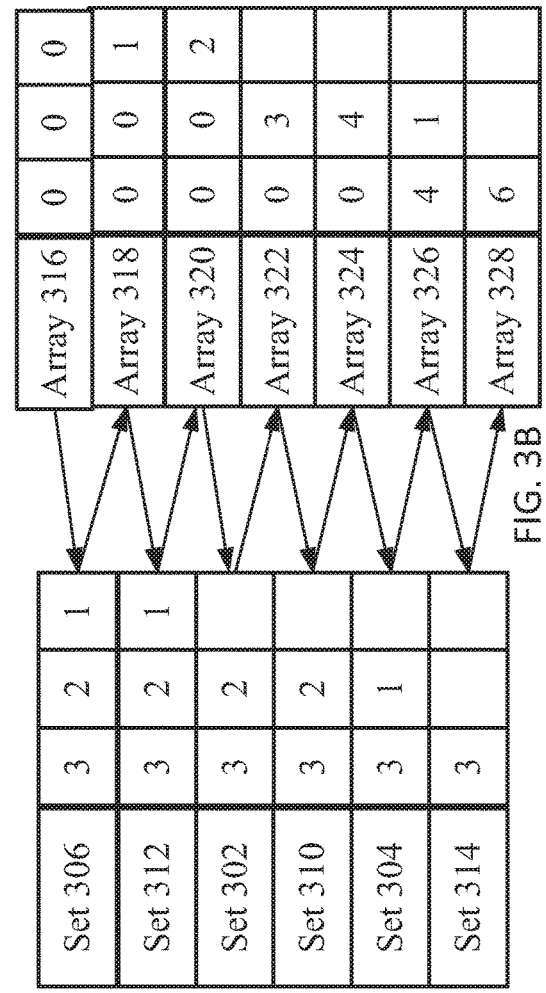
FIGS. 3 A-B illustrate block diagrams of extremely simplified examples of item sets and an array for suggesting query items based on database fields, in an embodiment.

As an overview example of the process depicted in FIGS. 3A-B, a database system has a long item set 9876543 followed by a short item set 982. In this example, there are counts associated with items 6, 5, and 4, which need to get rolled up into the item 8. FIGS. 3 A-B illustrate block diagrams 300 of extremely simplified examples of item sets and an array for identifying frequent item sets, in an embodiment. FIG. 3A includes identifier set 302 (identifier 3, identifier 2), identifier set 304 (identifier 3, identifier 1), identifier set 306 (identifier 3, identifier 2, identifier 1), identifier set 308 (identifier 2, identifier 1), identifier set 310 (identifier 3, identifier 2), identifier set 312 (identifier 3, identifier 2, identifier 1), and identifier set 314 (identifier 3), which are sorted in descending order. The identifier sets 302-314 correspond to the item sets (Contact A, Contact B), (Contact C, Contact A), (Contact C, Contact B, Contact A), (Contact B, Contact C), (Contact B, Contact A), (Contact A, Contact B, Contact C), and (Contact A), respectively.

The system partitions the item sets into the first group of item sets and the second group of item sets, with each group of item sets including a common largest identifier. For example, the database system partitions the item sets 302-306 and 310-314 into a first group of item sets that each have identifier 3 as the common largest identifier, and partitions the set 308 into a second group of item sets that has identifier 2 as the common largest identifier.

Then the system sorts each item set in the first group of item sets based on the identifiers in the item set position adjacent to the item set position for the common largest identifier. For example, since the first position in the item sets 302-306 and 310-314 includes the common largest identifier 3, the database system sorts these sets based on the identifiers included in the second position of these sets, which in these sets includes identifier 2, identifier 1, and null. An item set position can be a place or a location in an item set, such as the first position in the item set storing the common largest identifier. A position in an item set that is adjacent to another position in the item set can be a place or a location in an item set that is next to or adjoining another place or another position in the item set.

An item set can be considered as an array of positions from 0 to N. Given two item sets A and B, A<B (comes after B in the sort) if, in the first array position in which A and B differ, say 4, A[4]<B[4]. So if A is the item set [9,8,7,6,4,3] and B is the item set [9,8,7,6,5,2], A<B because 4<5. Next, the system sorts each item set that include the same identifier in the item set position adjacent to the item set position for the largest identifier based on the identifiers in the item set position adjacent to the item set position that is adjacent to the item set position for the common largest identifier. For example, since the item sets 302, 306, 310, and 312 have identifier 2 in the second position, the database system sorts these sets based on the identifiers in the third position, which in these sets includes identifier 1 and null. Although the sorting of the item sets 302-306 and 310-314 is complete in this extremely simplified example, the database system sorts item sets with more items by continuing to sort based on the next item set position until all of the item set positions have been sorted. The database system sorting the item sets 302-306 and 310-314 results in item sets that are prepared for sequential item set-by-item set comparison, as depicted in FIG. 3B.

The arrays 316-328 depicted in FIG. 3B are actually the same array used by the database system to determine the count for each subset of each item set of the first group of item sets, with the different reference numerals indicating the different states of this array at different points in time. The database system initializes the array 316 to (0, 0, 0), with the number of positions in the array 316 equaling the number of positions in the item set that has the largest number of items. The database system processes the item set 306 by modifying the array 316 (0, 0, 0) to become the array 318 (0, 0, 1). The count of 1 in the third position of the array 318 indicates that the items from the first position of the set 306 to the third position of the set 306 have been collectively identified 1 time so far by the database system.

The system determines whether an item set in a group of item sets matches the next item set in the group of item sets. For example, the database system determines whether the item set 306 (identifier 3, identifier 2, identifier 1) is the same as the item set 312 (identifier 3, identifier 2, identifier 1). One item set matching another item set can be the item sets being the same, equal, or identical, such as the item set 306 (identifier 3, identifier 2, identifier 1) being the same as the item set 312 (identifier 3, identifier 2, identifier 1).

If an item set in a group of item sets matches the next item set in the group of item sets, the system increments a count in a position in the array corresponding to a highest positioned item in the next item set. For example, since the item set 306 (identifier 3, identifier 2, identifier 1) is the same as the item set 312 (identifier 3, identifier 2, identifier 1), the database system modifies the array 318 (0, 0, 1) to become the array 320 (0, 0, 2). A highest positioned item in an item set can be an item that has a location that is associated with the largest numbered location in the item set, such as the third position in an item set that includes only three positions. The count of 2 in the third position of the array 320 indicates that the items from the first position of the set 312 to the third position of the set 312 have been collectively identified 2 times so far by the database system. Due to the sorting of item sets in the group of item sets, all of the item sets which are exactly the same will be sorted to be together, which enables the database system to quickly and efficiently sum the counts of the identical item sets.

Once again, the system determines whether one item set in the first group of item sets matches the next item set in the first group of item sets. For example, the database system determines whether the item set 312 (identifier 3, identifier 2, identifier 1) is the same as the item set 302 (identifier 3, identifier 2). If an item set in a group of item sets does not match the next item set in the group of item sets, the database system processes differing item sets. For example, since the item set 302 lacks identifier 1 that is present in the item set 312, the item set 312 does not match the item set 302, and the database system begins the process for the item sets determined to be not matching.

In the first process for item sets that the system determines to be not matching, the system identifies each subset of an item set that includes an item in the item set that lacks a match to a corresponding item in the next item set, a count for each subset of the item set being based on a count in a position in the array that corresponds to the item. For example, the database system identifies each subset of the item set 312 (identifier 3, identifier 2, identifier 1) that includes identifier 1 because identifier 1 lacks a match to any identifier in the item set 302 (identifier 3, identifier 2).

The database system determines the count of the subsets of item sets that include identifier 1 because the absence of identifier 1 in the set 302 indicates that subsequent sets may not include identifier 1. However, the database system minimizes the determination of counts for subsets of item sets by only counting subsets of item sets that include any identifier(s) that lacks a match in the next item set, which is identifier 1 in this example. The count for the subsets of the item set 312 that include identifier 1 is 2 because the array 320 has the count 2 in its third position, which corresponds to the third position in the item set 312 that has identifier 1. Therefore, the database system determines the count of 2 for the subset (identifier 3, identifier 2, identifier 1), the count of 2 for the subset (identifier 3, identifier 1), the count of 2 for the subset (identifier 2, identifier 1), and the count of 2 for the subset (identifier 1).

The database system may identify subsets of an item set based on the following algorithm. Given n positions of items in an item set, the item in each position can either appear in a subset of the item set or not appear in a subset of the item set. Therefore, the database system can identify subsets based on another array of Booleans, with the value of 1 indicating that an item in that position appears in a subset of the item set, and the value of 0 indicating that an item in that position does not appear in a subset of the item set. Consequently, the database system identifies $2^n-1$ subsets, without identifying the empty subset. This Boolean array also corresponds to a number that is based on the maximum value represented by the array, and each position in the array also corresponds to another number. For example, if the item set 312 (identifier 3, identifier 2, identifier 1) is reversed to become the reversed item set (identifier 1, identifier 2, identifier 3), then the Boolean array for the reversed item set has a maximum value of 7 (1, 1, 1 in binary) and identifier 1 has a value of 1 (1, 0, 0 in binary). Therefore, the database system identifies all subsets of item set 312 that include identifier 1 by identifying the subset corresponding to the array's binary value of 7, decrementing the array's binary value of 7 to the binary value of 6, identifying the subset corresponding to the array's binary value of 6, and continuing decrementing the array's binary values and identifying the subsets corresponding to these values, including the identification of the subset corresponding to the array's binary value of 1.

More generally, given a previous item set of length m and a new item set, the database system calculates the length n of the common prefix. The database system executes the following algorithm.

```
For k = m to n + 1 descending do
    for i = 2^k - 1 to 2^(k-1) do
        for the previous item set do
            create an empty item set
            for j = 1 to k do
```

-continued

```
            if the jth bit of i is 1, add the item in the jth position
            (if tracking ordering, append the ordering ids and
              counts)
          od
          emit the item set with the count in position k
          (for ordering, also emit the ids and counts for the original
            orders)
        od
      od
      increment the count in position k-1 by the count in position k
      set the value in position k to 0
      (if tracking ordering, free the list as well)
od
```

Therefore, the database system only identifies subsets for the positions in an item set which changed from the previous item set to the next item set. If the database system identifies some subsets more than once, the database system sums the counts of the corresponding subsets after processing the final item set in the group of item sets.

In the second process for item sets that the system identifies as not matching, the system adds a count from a position in the array, corresponding to a highest positioned item in the first item set, to a position in the array that corresponds to a highest positioned item that matches between the first item set and the second item set. For example, the database system adds the count of 2 in the third position of the array 320, which corresponds to the highest positioned identifier 1 in the set 212, to the second position in the array 320 which corresponds to identifier 2 in the set 302, which is the highest positioned item that matches between the set 312 and the set 302. Adding a count from the third position in the array 320 to the second position in the array 322 results in re-initializing the third position in the array 322 to zero. At this point, the array 322 depicted in FIG. 3 would have the count of 2 in the second position and a count of 0 in the third position if the set 302 had an item in the third position. However, since the set 302 has no item in the third position, the database system nulls the third position in the array 322, and continues processing the array 322.

In the third process for item sets that the system identifies as not matching, the system adds a count in a position in the array that corresponds to a highest positioned item in the second item set. For example, the database system adds a count of 1 to the second position in the array 322, which corresponds to identifier 2 in the set 302, which is the highest positioned item in the set 302. Since the database system had just added a count of 2 to the second position in the array 322, the subsequent addition of the count of 1 to the second position in the array 322 results in the count of 3 in the second position of the array 222, as depicted in FIG. 3. The count of 3 in the second position of the array 322 indicates that the items from the first position of the set 302 to the second position of the set 302 have been collectively identified 3 times so far by the database system.

Continuing the example, the database system determines whether the item set 302 (identifier 3, identifier 2) is the same as the item set 310 (identifier 3, identifier 2). Since the item set 302 (identifier 3, identifier 2) is the same as the item set 310 (identifier 3, identifier 2), the database system modifies the array 322 (0, 3) to become the array 324 (0, 4). The count of 4 in the second position of the array 324 indicates that the items from the first position of the set 310 to the second position of the set 310 have been collectively identified 4 times so far by the database system.

Further to the example, the database system determines whether the item set 310 (identifier 3, identifier 2) is the same as the item set 304 (identifier 3, identifier 1). Since the item set 304 lacks identifier 2 that is present in the item set 310, the item set 310 does not match the item set 304. Therefore, the database system identifies each subset of the item set 310 (identifier 3, identifier 2) that includes identifier 2 because identifier 2 lacks a match to any identifier in the item set 304 (identifier 3, identifier 1). The database system determines the count of the subsets of item sets that include identifier 2 because the absence of identifier 2 in the set 304 indicates that subsequent sets may not include identifier 2. However, the database system minimizes the determination of counts for subsets of item sets by only counting subsets of item sets that include any identifier(s) that lacks a match in the next item set, which is identifier 2 in this example. The count for the subsets of the item set 310 that include identifier 2 is 4 because the array 324 has the count 4 in its second position, which corresponds to the second position in the item set 310 that has identifier 2. Therefore, the database system determines the count of 4 for the subset (identifier 3, identifier 2), and the count of 4 for the subset (identifier 2).

Then the database system adds the count of 4 in the second position of the array 324, which corresponds to the highest positioned identifier 2 in the set 210, to the first position in the array 326 which corresponds to identifier 3 in the set 304, which is the highest positioned item that matches between the set 310 and the set 304. Adding a count from the second position in the array 324 to the first position in the array 326 results in re-setting the second position in the array 326 to zero. At this point, the array 326 depicted in FIG. 3 would have the count of 4 in the first position and a count of 0 in the third position. However, the database system continues processing the array 326 by adding a count of 1 to the second position in the array 326, which corresponds to identifier 1 in the set 304, which is the highest positioned item in the set 304. The count of 1 in the second position of the array 326 indicates that the items from the first position of the set 304 to the second position of the set 304 have been collectively identified 1 time so far by the database system. The count of 4 in the first position of the array 326 indicates that the item in the first position of the set 304 has been collectively identified 4 additional times, or 5 total times, so far by the database system.

Next in the example, the database system determines whether the item set 304 (identifier 3, identifier 1) is the same as the item set 314 (identifier 3). Since the item set 314 lacks identifier 1 that is present in the item set 310, the item set 304 does not match the item set 314. Therefore, the database system identifies each subset of the item set 304 (identifier 3, identifier 1) that includes identifier 1 because identifier 1 lacks a match to any identifier in the item set 314 (identifier 3). The database system determines the count of the subsets of item sets that include identifier 1 because the absence of identifier 1 in the set 314 indicates that subsequent sets may not include identifier 1. However, the database system minimizes the determination of counts for subsets of item sets by only counting subsets of item sets that include any identifier(s) that lacks a match in the next item set, which is identifier 1 in this example. The count for the subsets of the item set 304 that include identifier 1 is 1 because the array 326 has the count 1 in its second position, which corresponds to the second position in the item set 304 that has identifier 1. Therefore, the database system determines the count of 1 for the subset (identifier 3, identifier 1), and the count of 1 for the subset (identifier 1). The database system previously determined the count of 2 for the subset (identifier 3, identifier 1), and the count of 2 for the subset (identifier 1) when the database system determined that the set 302 lacked identifier 1. After the database system subsequently identifies the final item set in the first group of item sets, the database system aggregates counts for corresponding subsets, thereby resulting in the count of 3 for the subset (identifier 3, identifier 1), and the count of 3 for the subset (identifier 1).

Then the database system adds the count of 1 in the second position of the array 324, which corresponds to the highest positioned identifier 1 in the set 304, to the first position in the array 328 which corresponds to identifier 3 in the set 314, which is the highest positioned item that matches between the set 304 and the set 314. Adding a count from the second position in the array 326 to the first position in the array 328 results in re-setting the second position in the array 328 to zero. At this point, the array 328 depicted in FIG. 3 would have the count of 5 in the first position and a count of 0 in the second position if the set 314 had an item in the second position. However, since the set 314 has no item in the second position, the database system nulls the second position in the array 328, and continues processing the array 328 by adding a count of 1 to the first position in the array 328, which corresponds to identifier 3 in the set 314, which is the highest positioned item in the set 314. Since the database system had just added a count of 1 to the count of 4 in the first position in the array 328, the subsequent addition of the count of 1 to the first position in the array 328 results in the count of 6 in the first position of the array 328, as depicted in FIG. 3. The count of 6 in the first position of the array 328 indicates that the item in the first position of the set 314 has been collectively identified 6 times so far by the database system.

Upon identifying an item set as the final item set in the first group of item sets, the database system identifies each subset of the final item set, with the count for a subset of the final item set being based on the count in a position in the array that corresponds to the highest positioned item that is common to the subset. For example, the database system determines the count of 6 for the subset (identifier 3) because of the count of 6 in the first position of the array 328, corresponding to identifier 3 which is the highest positioned item that is common to the subset (identifier 3). Although this extremely simplified example results in the database system identifying only a single subset based on the final item set including only a single item, the database system may identify multiple subsets based on a final item set that includes multiple items. Examples of the database system identifying multiple subsets based on an item set that includes multiple items are described above.

In another example, if the set 304 was the final item set in the first group of item sets, then the database system would have identified each subset of the item set 304 (identifier 3, identifier 1). The count for the subsets of the item set 304 that include identifier 1 is 1 because the array 326 has the count 1 in its second position, which corresponds to the second position in the item set 304 that has identifier 1. Therefore, the database system would determine the count of 1 for the subset (identifier 3, identifier 1), and the count of 1 for the subset (identifier 1). The count for the subsets of the item set 304 that include identifier 3 is 4 because the array 326 has the count 4 in its first position, which corresponds to the first position in the item set 304 that has identifier 3. Therefore, the database system would determine the count of 4 for the subset (identifier 3).

If the database system is tracking the original sequences of items, the database system maintains an array or list of the original sequences of items. When the database system identifies that the previous item set in a group of item sets does not match the next item set in the group of item sets, the database system associates the counts and subsets for these item sets with the list of the original sequences of items. Just as the database system determines the count of each subset of each item set, the database system also determines the count of each original sequence of items that corresponds to each of these subsets. When the database system determines the count of each subset of each item set in each group of item sets, the database system can union the counts of subsets associated with the list of original sequences of items that are associated with each group of item sets, thereby enabling the database system to determine the count for each original sequence of items.

If the entire algorithm is executing on multiple computing platforms at once, many platforms are generating the same item sets that need to be combined. For example, if a first group of item sets has the highest item number 9 and includes the item set 9765, while a second group of item sets has highest the highest item number 8 and includes the item set 8765, the algorithm processing both groups will generate the item subset 765, each with some count and potentially a set of orderings. From the map/reduce perspective this has been the map part. In the reduce part, the algorithm sums the counts by concatenating the lists of original sequences because the lists from the first group are all from original item sets that contain item number 9 and the lists from the second group are all from original item sets that do not include item number 9, but do include item number 8. In terms of item sets, the algorithm is done. But in terms of ordering, the algorithm needs to run through the lists of original sequences and determine the probabilities of the orderings, so that, for example, when suggesting a next word, the algorithm knows what display order to suggest.

If the entire algorithm is executing on multiple computing platforms at once, many platforms are generating the same item sets that need to be combined. For example, if a first group of item sets has the highest item number 9 and includes the item set 9765, while a second group of item sets has highest the highest item number 8 and includes the item set 8765, the algorithm processing both groups will generate the item subset 765, each with some count and potentially a set of orderings. From the map/reduce perspective this has been the map part. In the reduce part, the algorithm sums the counts by concatenating the lists of original sequences because the lists from the first group are all from original item sets that contain item number 9 and the lists from the second group are all from original item sets that do not include item number 9, but do include item number 8. In terms of item sets, the algorithm is done. But in terms of ordering, the algorithm needs to run through the lists of original sequences and determine the probabilities of the orderings, so that, for example, when suggesting a next word, the algorithm knows what display order to suggest.

System Overview

Figure 4:
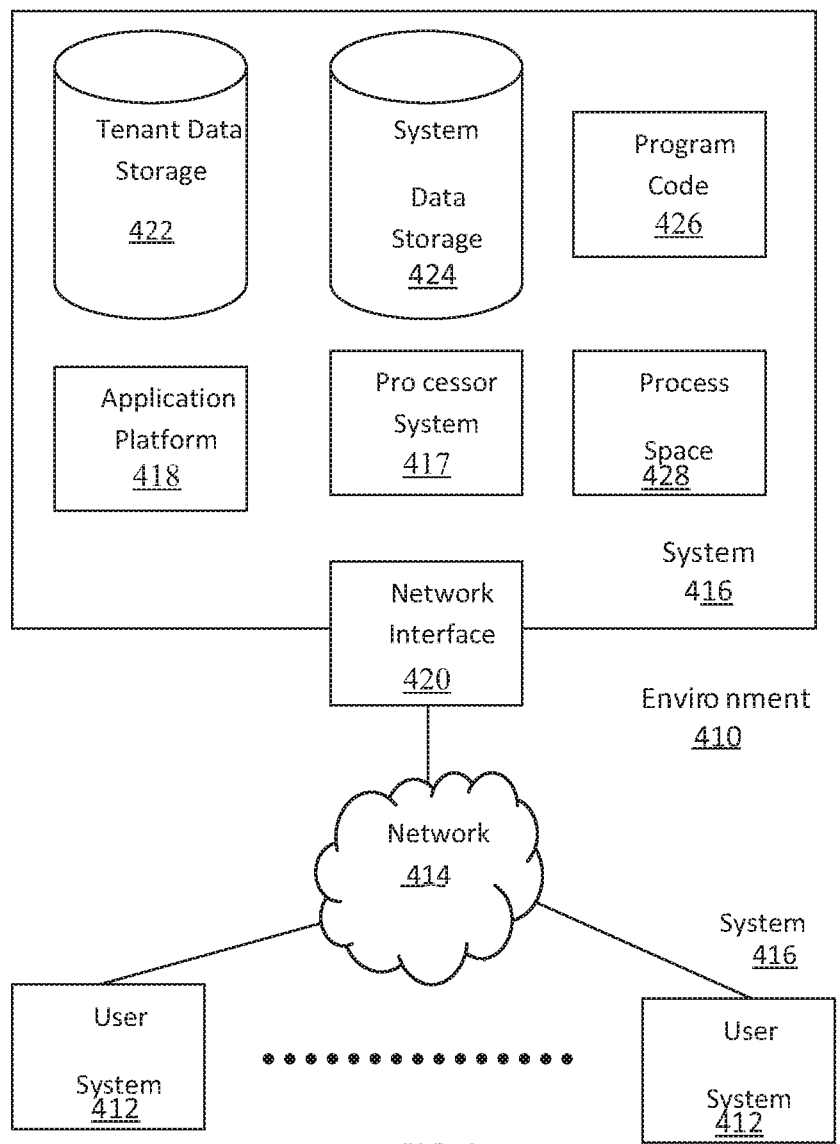
FIG. 4 illustrates a block diagram of an example of an environment wherein an on-demand database service might be used.

FIG. 4 illustrates a block diagram of an environment 410 wherein an on-demand database service might be used. The environment 410 may include user systems 412, a network 414, a system 416, a processor system 417, an application platform 418, a network interface 420, a tenant data storage 422, a system data storage 424, program code 426, and a process space 428. In other embodiments, the environment 410 may not have all of the components listed and/or may have other elements instead of, or in addition to, those listed above.

The environment 410 is an environment in which an on-demand database service exists. A user system 412 may be any machine or system that is used by a user to access a database user system. For example, any of the user systems 412 may be a handheld computing device, a mobile phone, a laptop computer, a work station, and/or a network of computing devices. As illustrated in FIG. 4 (and in more detail in FIG. 5) the user systems 412 might interact via the network 414 with an on-demand database service, which is the system 416.

An on-demand database service, such as the system 416, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, the "on-demand database service 416" and the "system 416" will be used interchangeably herein. A database image may include one or more database objects. A relational database management system (RDMS) or the equivalent may execute storage and retrieval of information against the database object(s). The application platform 418 may be a framework that allows the applications of the system 416 to run, such as the hardware and/or software, e.g., the operating system. In an embodiment, the on-demand database service 416 may include the application platform 418 which enables creation, managing and executing one or more applications developed by the provider of the on-demand database service, users accessing the on-demand database service via user systems 412, or third party application developers accessing the on-demand database service via the user systems 412.

The users of the user systems 412 may differ in their respective capacities, and the capacity of a particular user system 412 might be entirely determined by permissions (permission levels) for the current user. For example, where a salesperson is using a particular user system 412 to interact with the system 416, that user system 412 has the capacities allotted to that salesperson. However, while an administrator is using that user system 412 to interact with the system 416, that user system 412 has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

The network 414 is any network or combination of networks of devices that communicate with one another. For example, the network 414 may be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that the one or more implementations might use are not so limited, although TCP/IP is a frequently implemented protocol.

The user systems 412 might communicate with the system 416 using TCP/IP and, at a higher network level, use other common Internet protocols to communicate, such as HTTP, FTP, AFS, WAP, etc. In an example where HTTP is used, the user systems 412 might include an HTTP client commonly referred to as a "browser" for sending and receiving HTTP messages to and from an HTTP server at the system 416. Such an HTTP server might be implemented as the sole network interface between the system 416 and the network 414, but other techniques might be used as well or instead. In some implementations, the interface between the system 416 and the network 414 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, the system 416, shown in FIG. 4, implements a web-based customer relationship management (CRM) system. For example, in one embodiment, the system 416 includes application servers configured to implement and execute CRM software applications as well as provide related data, code, forms, webpages and other information to and from the user systems 412 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, the system 416 implements applications other than, or in addition to, a CRM application. For example, the system 416 may provide tenant access to multiple hosted (standard and custom) applications, including a CRM application. User (or third party developer) applications, which may or may not include CRM, may be supported by the application platform 418, which manages creation, storage of the applications into one or more database objects and executing of the applications in a virtual machine in the process space of the system 416.

One arrangement for elements of the system 416 is shown in FIG. 4, including the network interface 420, the application platform 418, the tenant data storage 422 for tenant data 423, the system data storage 424 for system data 425 accessible to the system 416 and possibly multiple tenants, the program code 426 for implementing various functions of the system 416, and the process space 428 for executing MTS system processes and tenant-specific processes, such as running applications as part of an application hosting service. Additional processes that may execute on the system 416 include database indexing processes.

Several elements in the system shown in FIG. 4 include conventional, well-known elements that are explained only briefly here. For example, each of the user systems 412 could include a desktop personal computer, workstation, laptop, PDA, cell phone, or any wireless access protocol (WAP) enabled device or any other computing device capable of interfacing directly or indirectly to the Internet or other network connection. Each of the user systems 412 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of the user systems 412 to access, process and view information, pages and applications available to it from the system 416 over the network 414. Each of the user systems 412 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by the system 416 or other systems or servers. For example, the user interface device may be used to access data and applications hosted by the system 416, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each of the user systems 412 and all of its components are operator configurable using applications, such as a browser, including computer code run using a central processing unit such as an Intel Pentium® processor or the like. Similarly, the system 416 (and additional instances of an MTS, where more than one is present) and all of their components might be operator configurable using application(s) including computer code to run using a central processing unit such as the processor system 417, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein. Computer code for operating and configuring the system 416 to intercommunicate and to process web pages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, the system 416 is configured to provide webpages, forms, applications, data and media content to the user (client) systems 412 to support the access by the user systems 412 as tenants of the system 416. As such, the system 416 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 5:
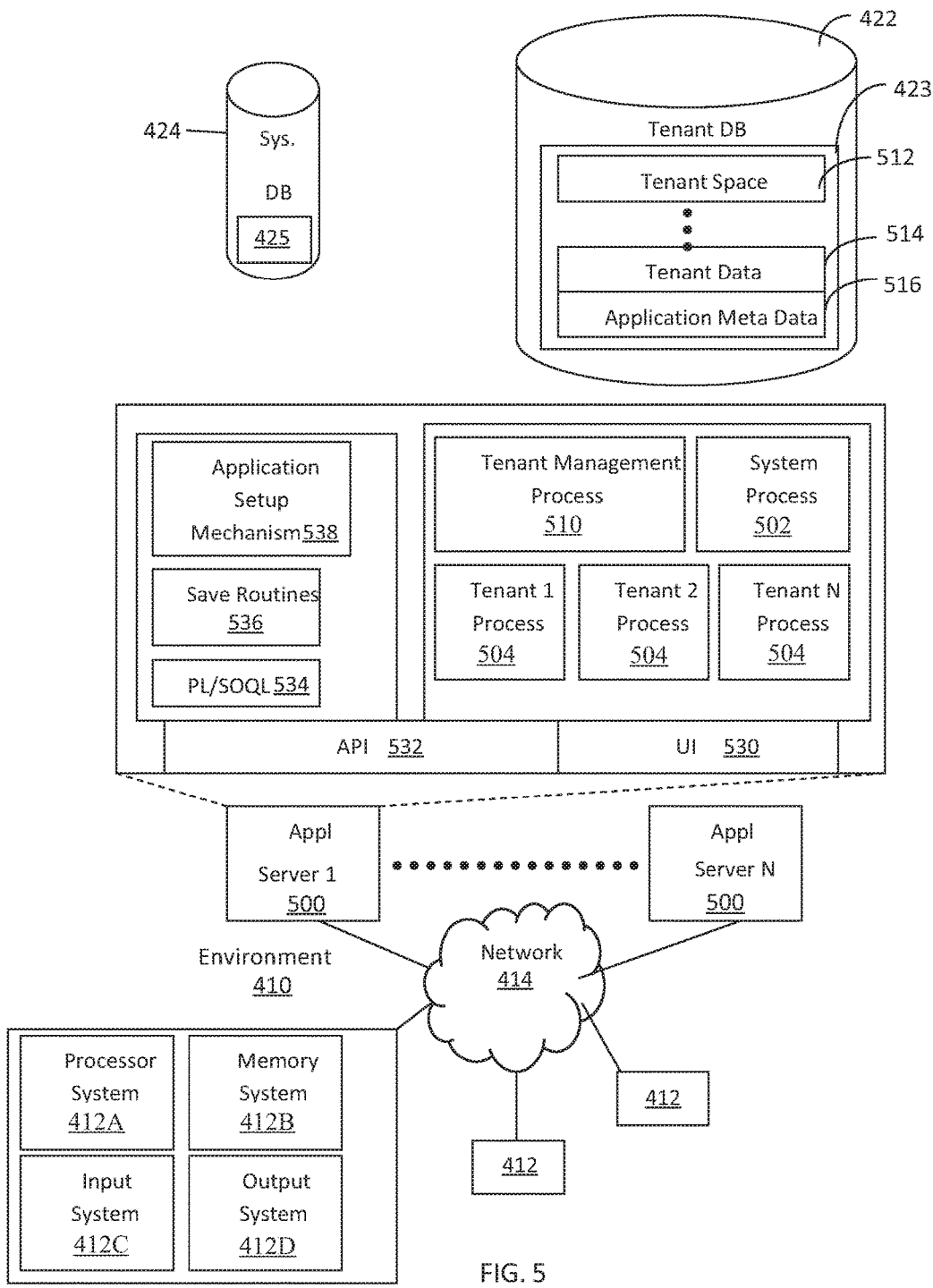
FIG. 5 illustrates a block diagram of an embodiment of elements of FIG. 4 and various possible interconnections between these elements.

FIG. 5 also illustrates the environment 410. However, in FIG. 5 elements of the system 416 and various interconnections in an embodiment are further illustrated. FIG. 5 shows that the each of the user systems 412 may include a processor system 412A, a memory system 412B, an input system 412C, and an output system 412D. FIG. 5 shows the network 414 and the system 416. FIG. 5 also shows that the system 416 may include the tenant data storage 422, the tenant data 423, the system data storage 424, the system data 425, a User Interface (UI) 530, an Application Program Interface (API) 532, a PL/SOQL 534, save routines 536, an application setup mechanism 538, applications servers $500_1$-$500_N$, a system process space 502, tenant process spaces 504, a tenant management process space 510, a tenant storage area 512, a user storage 514, and application metadata 516. In other embodiments, the environment 410 may not have the same elements as those listed above and/or may have other elements instead of, or in addition to, those listed above.

The user systems 412, the network 414, the system 416, the tenant data storage 422, and the system data storage 424 were discussed above in reference to FIG. 4. Regarding the user systems 412, the processor system 412A may be any combination of one or more processors. The memory system 412B may be any combination of one or more memory devices, short term, and/or long term memory. The input system 412C may be any combination of input devices, such as one or more keyboards, mice, trackballs, scanners, cameras, and/or interfaces to networks. The output system 412D may be any combination of output devices, such as one or more monitors, printers, and/or interfaces to networks. As shown by FIG. 5, the system 416 may include the network interface 420 (of FIG. 4) implemented as a set of HTTP application servers 500, the application platform 418, the tenant data storage 422, and the system data storage 424. Also shown is the system process space 502, including individual tenant process spaces 504 and the tenant management process space 510. Each application server 500 may be configured to access tenant data storage 422 and the tenant data 423 therein, and the system data storage 424 and the system data 425 therein to serve requests of the user systems 412. The tenant data 423 might be divided into individual tenant storage areas 512, which can be either a physical arrangement and/or a logical arrangement of data. Within each tenant storage area 512, the user storage 514 and the application metadata 516 might be similarly allocated for each user. For example, a copy of a user's most recently used (MRU) items might be stored to the user storage 514. Similarly, a copy of MRU items for an entire organization that is a tenant might be stored to the tenant storage area 512. The UI 530 provides a user interface and the API 532 provides an application programmer interface to the system 416 resident processes to users and/or developers at the user systems 412. The tenant data and the system data may be stored in various databases, such as one or more Oracle™ databases.

The application platform 418 includes the application setup mechanism 538 that supports application developers' creation and management of applications, which may be saved as metadata into the tenant data storage 422 by the save routines 536 for execution by subscribers as one or more tenant process spaces 504 managed by the tenant management process 510 for example. Invocations to such applications may be coded using the PL/SOQL 534 that provides a programming language style interface extension to the API 532. A detailed description of some PL/SOQL language embodiments is discussed in commonly owned U.S. Pat. No. 7,730,478 entitled, METHOD AND SYSTEM FOR ALLOWING ACCESS TO DEVELOPED APPLICATIONS VIA A MULTI-TENANT ON-DEMAND DATABASE SERVICE, by Craig Weissman, filed Sep. 21, 2007, which is incorporated in its entirety herein for all purposes. Invocations to applications may be detected by one or more system processes, which manages retrieving the application metadata 516 for the subscriber making the invocation and executing the metadata as an application in a virtual machine.

Each application server 500 may be communicably coupled to database systems, e.g., having access to the system data 425 and the tenant data 423, via a different network connection. For example, one application server $500_1$ might be coupled via the network 414 (e.g., the Internet), another application server $500_{N-1}$ might be coupled via a direct network link, and another application server $500_N$ might be coupled by yet a different network connection. Transfer Control Protocol and Internet Protocol (TCP/IP) are typical protocols for communicating between application servers 500 and the database system. However, it will be apparent to one skilled in the art that other transport protocols may be used to optimize the system depending on the network interconnect used.

In certain embodiments, each application server 500 is configured to handle requests for any user associated with any organization that is a tenant. Because it is desirable to be able to add and remove application servers from the server pool at any time for any reason, there is preferably no server affinity for a user and/or organization to a specific application server 500. In one embodiment, therefore, an interface system implementing a load balancing function (e.g., an F5 Big-IP load balancer) is communicably coupled between the application servers 500 and the user systems 412 to distribute requests to the application servers 500. In one embodiment, the load balancer uses a least connections algorithm to route user requests to the application servers 500. Other examples of load balancing algorithms, such as round robin and observed response time, also can be used. For example, in certain embodiments, three consecutive requests from the same user could hit three different application servers 500, and three requests from different users could hit the same application server 500. In this manner, the system 416 is multi-tenant, wherein the system 416 handles storage of, and access to, different objects, data and applications across disparate users and organizations.

As an example of storage, one tenant might be a company that employs a sales force where each salesperson uses the system 416 to manage their sales process. Thus, a user might maintain contact data, leads data, customer follow-up data, performance data, goals and progress data, etc., all applicable to that user's personal sales process (e.g., in the tenant data storage 422). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by the system 416 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, the system 416 might also maintain system level data usable by multiple tenants or other data. Such system level data might include industry reports, news, postings, and the like that are sharable among tenants.

In certain embodiments, the user systems 412 (which may be client systems) communicate with the application servers 500 to request and update system-level and tenant-level data from the system 416 that may require sending one or more queries to the tenant data storage 422 and/or the system data storage 424. The system 416 (e.g., an application server 500 in the system 416) automatically generates one or more SQL statements (e.g., one or more SQL queries) that are designed to access the desired information. The system data storage 424 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. Pat. No. 7,779,039, filed Apr. 2, 2004, entitled "Custom Entities and Fields in a Multi-Tenant Database System", which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

The invention claimed is:

1. A system comprising:
one or more processors; and
a non-transitory computer readable medium storing a plurality of instructions, which when executed, cause the one or more processors to:
receive, by a database system, a character sequence entered in a search box;
identify, by the database system, a first distribution of first field-based items, the first field-based items including the character sequence;
identify, by the database system, a second distribution of second field-based, the second field-based items including the character sequence;
identify, by the database system, a first item from the first field-based items based on combining the first distribution of first field-based items that are stored in a first type of database field with a probability distribution of all types of queried database fields, and a second item from the second field-based items based on combining the second distribution of second field-based items that are stored in a second type of database field with the probability distribution of all types of queried database fields;
output, by the database system, the first item and the second item to a location associated with the search box;
receive, by the database system, a selection of the first item or the second item from the location associated with the search box; and
execute, by the database system, a search based on the selection, in response to receiving a request to search for any item output to the location associated with the search box.

2. The system of claim 1, comprising further instructions, which when executed, cause the one or more processors to identify, by the database system, the first distribution of first field-based items including the character sequence based on proportions of items that were in historical queries, that are stored by a first field, and that start with the character sequence.

3. The system of claim 1, comprising further instructions, which when executed, cause the one or more processors to identify, by the database system, the probability distribution of all types of queried database fields based on identifying items in historical queries and determining proportions of fields that store the identified items.

4. The system of claim 1, wherein identifying the first item and the second item is based on the first item and the second item being associated with corresponding item proportions that are larger than corresponding item proportions associated with a plurality of different items.

5. The system of claim 1, comprising further instructions, which when executed, cause the one or more processors to:
receive, by the database system, an additional character sequence entered in the search box;
identify, by the database system, a third distribution of third field-based items including the additional character sequence, and a fourth distribution of fourth field-based items including the additional character sequence;
identify, by the database system, a third item based on combining the third distribution with query schemas including a field storing the selected item, and a fourth item based on combining the fourth distribution with the query schemas including the field storing the selected item; and
output, by the database system, the third item and the fourth item to the location associated with the search box.

6. The system of claim 5, comprising further instructions, which when executed, cause the one or more processors to identify, by the database system, the query schemas including the field storing the selected item based on proportions of fields being associated with the field storing the selected item via association with queried sets of items associated with the field storing the selected item.

7. The system of claim 5, wherein identifying the third item and the fourth item is based on the third item and the fourth item being associated with corresponding item proportions that are larger than corresponding item proportions associated with a plurality of different items.

8. A computer program product comprising computer-readable program code to be executed by one or more processors when retrieved from a non-transitory computer-readable medium, the program code including instructions to:
receive, by a database system, a character sequence entered in a search box;
identify, by the database system, a first distribution of first field-based, the first field-based items including the character sequence;
identify, by the database system, a second distribution of second field-based items, the second field-based items including the character sequence;
identify, by the database system, a first item from the first field-based items based on combining the first distribution of first field-based items that are stored in a first type of database field with a probability distribution of all types of queried database fields, and a second item from the second field-based items based on combining the second distribution of second field-based items that are stored in a second type of database field with the probability distribution of all types of queried database fields;

output, by the database system, the first item and the second item to a location associated with the search box;

receive, by the database system, a selection of the first item or the second item from the location associated with the search box; and execute, by the database system, a search based on the selection, in response to receiving a request to search for any item output to the location associated with the search box.

9. The computer program product of claim 8, wherein the program code comprises further instructions to identify, by the database system, the first distribution of first field-based items including the character sequence based on proportions of items that were in historical queries, that are stored by a first field, and that start with the character sequence.

10. The computer program product of claim 8, wherein the program code comprises further instructions to identify, by the database system, the probability distribution of all types of queried database fields based on identifying items in historical queries and determining proportions of fields that store the identified items.

11. The computer program product of claim 8, wherein identifying the first item and the second item is based on the first item and the second item being associated with corresponding item proportions that are larger than corresponding item proportions associated with a plurality of different items.

12. The computer program product of claim 8, wherein the program code comprises further instructions to:

receive, by the database system, and an additional character sequence entered in the search box;

identify, by the database system, a third distribution of third field-based items including the additional character sequence, and a fourth distribution of fourth field-based items including the additional character sequence;

identify, by the database system, a third item based on combining the third distribution with query schemas including a field storing the selected item, and a fourth item based on combining the fourth distribution with the query schemas including the field storing the selected item; and output, by the database system, the third item and the fourth item to the location associated with the search box.

13. The computer program product of claim 12, wherein the program code comprises further instructions to identify, by the database system, the query schemas including the field storing the selected item based on proportions of fields being associated with the field storing the selected item via association with queried sets of items associated with the field storing the selected item.

14. The computer program product of claim 12, wherein identifying the third item and the fourth item is based on the third item and the fourth item being associated with corresponding item proportions that are larger than corresponding item proportions associated with a plurality of different items.

15. A method comprising:

receiving, by a database system, a character sequence entered in a search box;

identifying, by the database system, a first distribution of first field-based items, the first field-based items including the character sequence;

identifying, by the database system, a second distribution of second field-based items, the second field-based items including the character sequence;

identifying, by the database system, a first item from the first field-based items based on combining the first distribution of first field-based items that are stored in a first type of database field with a probability distribution of all types of queried database fields, and a second item from the second field-based items based on combining the second distribution of second field-based items that are stored in a second type of database field with the probability distribution of all types of queried database fields;

outputting, by the database system, the first item and the second item to a location associated with the search box;

receiving, by the database system, a selection of the first item or the second item from the location associated with the search box; and executing, by the database system, a search based on the selection, in response to receiving a request to search for any item output to the location associated with the search box.

16. The method of claim 15, wherein the method further comprises identifying, by the database system, the first distribution of first field-based items including the character sequence based on proportions of items that were in historical queries, that are stored by a first field, and that start with the character sequence.

17. The method of claim 15, wherein the method further comprises identifying, by the database system, the probability distribution of all types of queried database fields based on identifying items in historical queries and determining proportions of fields that store the identified items.

18. The method of claim 15, wherein identifying the first item and the second item is based on the first item and the second item being associated with corresponding item proportions that are larger than corresponding item proportions associated with a plurality of different items.

19. The method of claim 15, wherein the method further comprises:

receiving, by the database system, and an additional character sequence entered in the search box;

identifying, by the database system, a third distribution of third field-based items including the additional character sequence, and a fourth distribution of fourth field-based items including the additional character sequence;

identifying, by the database system, a third item based on combining the third distribution with query schemas including a field storing the selected item, and a fourth item based on combining the fourth distribution with the query schemas including the field storing the selected item; and outputting, by the database system, the third item and the fourth item to the location associated with the search box.

20. The method of claim 19, wherein the method further comprises identifying, by the database system, the query schemas including the field storing the selected item based on proportions of fields being associated with the field storing the selected item via association with queried sets of items associated with the field storing the selected item, wherein identifying the third item and the fourth item is based on the third item and the fourth item being associated with corresponding item proportions that are larger than corresponding item proportions associated with a plurality of different items.

\* \* \* \* \*